United States Patent
Hao et al.

(10) Patent No.: US 10,636,453 B1
(45) Date of Patent: Apr. 28, 2020

(54) EXTERNALLY-VIEWABLE HARD DISK INDICATOR BOARD AND ELECTRONIC DEVICE USING THE SAME

(71) Applicant: Shenzhen Fugui Precision Ind. Co., Ltd., Shenzhen (CN)

(72) Inventors: Li-Yun Hao, Tianjin (CN); Duo Qiu, Shenzhen (CN)

(73) Assignee: Shenzhen Fugui Precision Ind. Co., Ltd., Shenzhen (CN)

( * ) Notice: Subject to any disclaimer, the term of this patent is extended or adjusted under 35 U.S.C. 154(b) by 0 days.

(21) Appl. No.: 16/354,451

(22) Filed: Mar. 15, 2019

(30) Foreign Application Priority Data

Feb. 25, 2019 (CN) .......................... 2019 1 0137479

(51) Int. Cl.
*G11B 33/10* (2006.01)
*G11B 33/02* (2006.01)

(52) U.S. Cl.
CPC ............ *G11B 33/10* (2013.01); *G11B 33/022* (2013.01)

(58) Field of Classification Search
None
See application file for complete search history.

(56) References Cited

U.S. PATENT DOCUMENTS

| | | | | |
|---|---|---|---|---|
| 8,078,770 B1 * | 12/2011 | Sivertsen | ............ | G06F 13/4282 710/19 |
| 2004/0057202 A1 * | 3/2004 | Rabinovitz | ............. | G06F 1/184 361/679.02 |
| 2004/0057203 A1 * | 3/2004 | Rabinovitz | ............. | G06F 1/184 361/679.31 |
| 2007/0053250 A1 * | 3/2007 | Wu | ........... | G06F 1/181 369/30.86 |
| 2009/0145321 A1 * | 6/2009 | Russell | ..................... | F42B 4/00 102/215 |
| 2009/0236996 A1 * | 9/2009 | Xiao | ...................... | G11B 33/10 315/197 |
| 2010/0141462 A1 * | 6/2010 | Qiu | ........................ | G06F 11/325 340/653 |
| 2011/0090633 A1 * | 4/2011 | Rabinovitz | ............. | G06F 1/184 361/679.31 |
| 2012/0133520 A1 * | 5/2012 | Chang | ................... | G06F 13/409 340/635 |
| 2012/0278661 A1 * | 11/2012 | Cong | ..................... | G11B 33/10 714/39 |
| 2013/0212429 A1 * | 8/2013 | Nakayama | .......... | G06F 11/1076 714/6.22 |
| 2013/0317753 A1 * | 11/2013 | Kamen | ................ | G06F 3/0481 702/19 |

(Continued)

FOREIGN PATENT DOCUMENTS

CN 206515814 U * 9/2017
CN 206684651 U * 11/2017

*Primary Examiner* — Fekadeselassie Girma
(74) *Attorney, Agent, or Firm* — ScienBiziP, P.C.

(57) ABSTRACT

An electronic device providing visible indications as to the status of each hard disk in an internal hard disk module includes a housing, a display board, and hard disk controller. The display board displays the operating status of each disk of a plurality of hard disks. The housing defines a first mounting area and a second mounting area. The first mounting area and the second mounting area are spaced apart to form a slot, and the viewable display board is slidably mounted to the slot.

11 Claims, 3 Drawing Sheets

(56) References Cited

U.S. PATENT DOCUMENTS

| | | | |
|---|---|---|---|
| 2014/0189168 A1* | 7/2014 | Chen | G06F 3/0653 |
| | | | 710/19 |
| 2014/0344484 A1* | 11/2014 | Tian | G06F 11/325 |
| | | | 710/19 |
| 2015/0375226 A1* | 12/2015 | Yoo | B01L 3/502738 |
| | | | 436/45 |
| 2017/0168964 A1* | 6/2017 | Kung | G06F 13/4068 |
| 2019/0320547 A1* | 10/2019 | Yun | H05K 7/1418 |

* cited by examiner

EXTERNALLY-VIEWABLE HARD DISK INDICATOR BOARD AND ELECTRONIC DEVICE USING THE SAME

FIELD

The subject matter herein generally relates to status displays.

BACKGROUND

An electronic device can have multiple hard disks, each hard disk backplane has a complex programmable logic device (CPLD) to receive the serial general purpose input output (SGPIO) of the hard disk manager. The CPLD parses the SGPIO signal to display the status of the hard disk. Electronic devices with multiple hard drives require multiple CPLDs, which creates a significant cost. In addition, the status indicator on the backplane cannot be seen from the outside of the electronic device.

Therefore there is a room for improvement.

BRIEF DESCRIPTION OF THE DRAWINGS

Implementations of the present disclosure will now be described, by way of example only, with reference to the attached figures.

DETAILED DESCRIPTION

Figure 1:
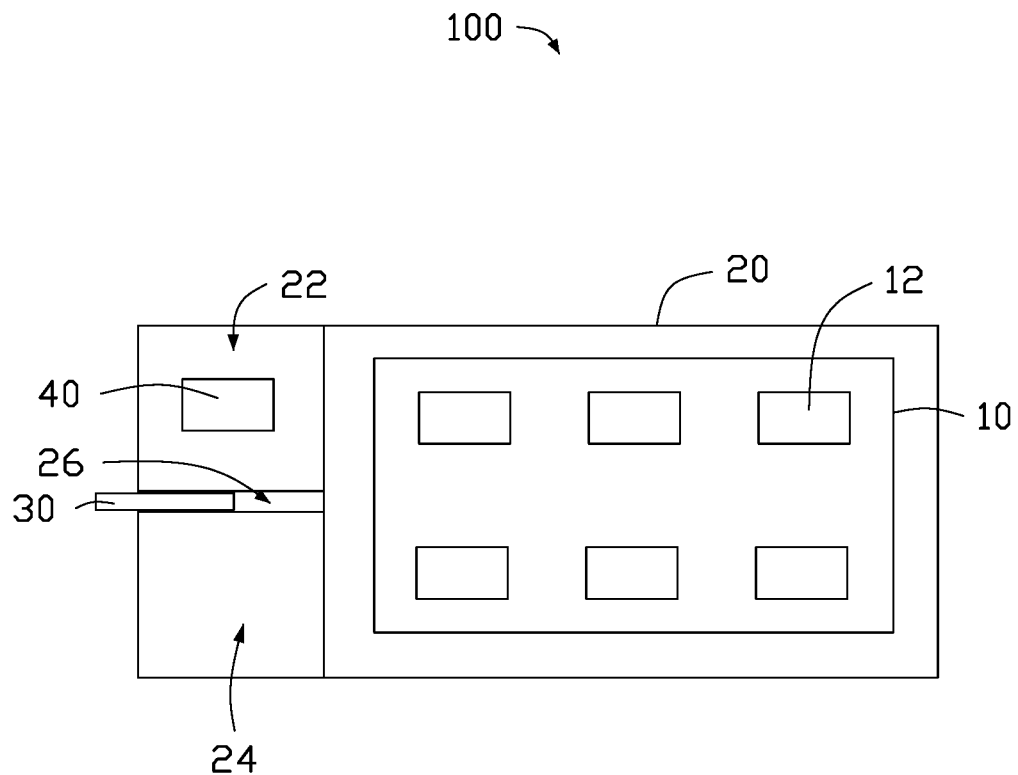
FIG. 1 is a schematic diagram of an embodiment of an electronic device.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

FIG. 1 illustrates an electronic device 100 in accordance with an embodiment of the present disclosure. The electronic device 100 includes a hard disk module 10, a housing 20, an externally-visible indicator in the form of a display board (display board 30), and hard disk controller 40.

In at least one embodiment, the electronic device 100 can be a server.

The hard disk module 10 includes a plurality of hard disks 12. The hard disk module 10 is received in a first side of the housing 20, and a first mounting area 22 and a second mounting area 24 are defined at a second side of the housing 20.

The first mounting area 22 and the second mounting area 24 are spaced apart to form a slot 26. The hard disk controller 40 is disposed on the first mounting area 22, and other electronic modules are disposed on the second mounting area 24.

The display board 30 displays the respective statuses of the plurality of hard disks 12. The display board 30 is slidably mounted to the slot 26. Therefore, the display board 30 can protrude from or be received in the housing 20 in the direction of the slot 26.

When the display board 30 is pulled out from the housing 20, the operating statuses of the plurality of hard disks 12 can be viewed through the display board 30.

In at least one embodiment, the status of the hard disks 12 may include active status, positioning status, reconstruction status, and fault status.

Figure 2:
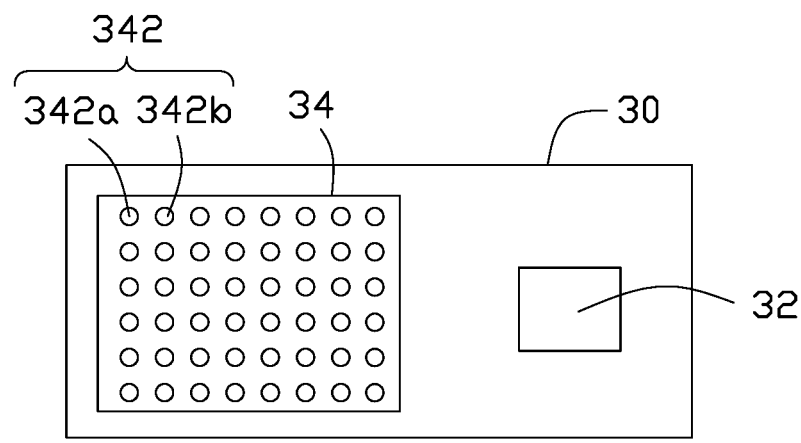
FIG. 2 is a schematic diagram of an embodiment of an indicator board in the device of FIG. 1.
Figure 3:
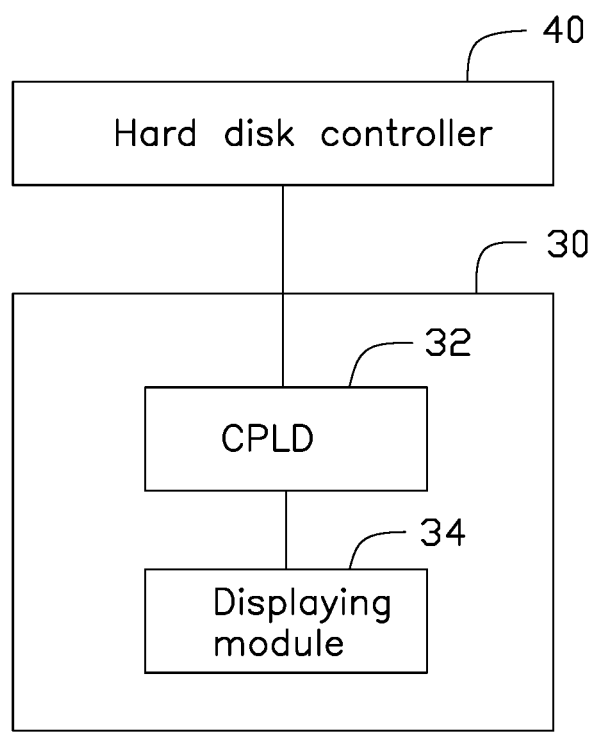
FIG. 3 is a block diagram of the electronic device of FIG. 1.

FIGS. 2 and 3 illustrate that the display board 30 includes a complex programmable logic device (CPLD 32) and a displaying module 34.

The hard disk controller 40 is electrically coupled to the hard disk module 10. The hard disk controller 40 obtains information of the hard disks 12, and outputs signals accordingly to the display board 30.

In at least one embodiment, the hard disk controller 40 can be a platform controller hub (PCH).

The CPLD 32 is electrically coupled to the hard disk controller 40. The CPLD 32 communicates with the hard disk controller 40, and receives signals from the hard disk controller 40. The CPLD 32 decodes the signals and outputs control signals to the displaying module 34 accordingly.

In at least one exemplary embodiment, the CPLD 32 communicates with the hard disk controller 40 through serial general purpose input output (SGPIO) bus, the status signal is an SGPIO signal.

The displaying module 34 communicates with the CPLD 32, and receives the control signal from the CPLD 32. The displaying module 34 outputs display information accordingly.

In at least one embodiment, the displaying module 34 includes a plurality of light emitting diode (LED) units 342, each of the LED units 342 includes a first LED 342a and a second LED 342b. Each of the LED units 342 corresponds to one of the hard disks 12.

For example, if the operating status of the hard disk 12 is active, both the first LED 342a and the second LED 342 are turned off.

If the operating status of the hard disk 12 is positioning, the first LED 342a is turned off, and the second LED 342b flashes at a frequency of 4 Hz.

If the operating status of the hard disk 12 is reconstruction, the first LED 342a is turned off, and the second LED 342b flashes at a frequency of 1 Hz.

If the operating status of the hard disk 12 is fault, the first LED 342a is turned off, and the second LED 342b is continually on.

When it is necessary to view the operating status of these hard disks 12, user pulls the display board 30 out from the slot 26. When it is not necessary to view the operating status of these hard disks 12, user can insert the display board 30 into the housing 20.

Therefore, the operating status of the hard disks 12 in the electronic device 100 can be conveniently viewed.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A display board electrically coupling to a hard disk controller, the hard disk controller obtaining status information of a plurality of hard disks and outputting status signal to the display board, the display board comprising:
   a complex programmable logic device (CPLD) electrically coupling to the hard disk controller; wherein the complex programmable logic device obtains the status signal from the hard disk controller, and decodes the status signal to output control signal;
   a displaying module electrically coupling to the complex programmable logic device; wherein the displaying module receives the control signal, and outputs display information according to the control signal;
   wherein the displaying module comprises a plurality of light emitting diode (LED) units, each of the LED units correspondingly displays the operating status of each of the hard disks;
   wherein the each of the LED units comprises a first LED and a second LED, when the operating status of the hard disk is active status, both the first LED and the second LED are turned off; and
   wherein when the operating status of the hard disk is positioning status, the first LED is turned off, and the second LED flashes at a frequency of 4 Hz.

2. The display board of claim 1, wherein when the operating status of the hard disk is reconstruction status, the first LED is turned off, and the second LED flashes at a frequency of 1 Hz.

3. The display board of claim 2, wherein when the operating status of the hard disk is fault status, the first LED is turned off, and the second LED is turned on.

4. A display board electrically coupling to a hard disk controller, the hard disk controller obtaining status information of a plurality of hard disks and outputting status signal to the display board, the display board comprising:
   a complex programmable logic device (CPLD) electrically coupling to the hard disk controller; wherein the complex programmable logic device obtains the status signal from the hard disk controller, and decodes the status signal to output control signal;
   a displaying module electrically coupling to the complex programmable logic device; wherein the displaying module receives the control signal, and outputs display information according to the control signal;
   wherein the complex programmable logic device is electrically coupled to hard disk controller through serial general purpose input output (SGPIO) bus, and the status signal is SGPIO signal;
   wherein the displaying module comprises a plurality of light emitting diode (LED) units, each of the LED units correspondingly displays the operating status of each of the hard disks;
   wherein the each of the LED units comprises a first LED and a second LED, when the operating status of the hard disk is active status, both the first LED and the second LED are turned off; and
   wherein when the operating status of the hard disk is positioning status, the first LED is turned off, and the second LED flashes at a frequency of 4 Hz.

5. The display board of claim 4, wherein when the operating status of the hard disk is reconstruction status, the first LED is turned off, and the second LED flashes at a frequency of 1 Hz.

6. The display board of claim 5, wherein when the operating status of the hard disk is fault status, the first LED is turned off, and the second LED is turned on.

7. An electronic device comprising:
   a hard disk module comprising a plurality of hard disks;
   a hard disk controller obtaining status information of the plurality of hard disks and outputting status signal; and
   a display board coupling to the hard disk controller, comprising:
      a complex programmable logic device (CPLD) electrically coupling to the hard disk controller; wherein the complex programmable logic device obtains the status signal from the hard disk controller, and decodes the status signal to output control signal;
      a displaying module electrically coupling to the complex programmable logic device; wherein the displaying module receives the control signal, and outputs display information according to the control signal;
      wherein the displaying module comprises a plurality of light emitting diode (LED) units, each of the LED units correspondingly displays the operating status of each of the hard disks; and
      wherein the each of the LED units comprises a first LED and a second LED, when the operating status of the hard disk is active status, both the first LED and the second LED are turned off; when the operating status of the hard disk is positioning status, the first LED is turned off, and the second LED flashes at a frequency of 4 Hz.

8. The electronic device of claim 7, wherein the electronic device further comprises a housing, and the hard disk module is received in a first side of the housing.

9. The electronic device of claim 8, wherein a second side of the housing defines a first mounting area, and the hard disk controller is disposed on the first mounting area.

10. The electronic device of claim 9, wherein the second side of the housing defines a second mounting area, the first mounting area and the second mounting area are spaced apart to form a slot, and the display board is slidably mounted to the slot.

11. The electronic device of claim 7, wherein when the operating status of the hard disk is reconstruction status, the first LED is turned off, and the second LED flashes at a frequency of 1 Hz; when the operating status of the hard disk is fault status, the first LED is turned off, and the second LED is turned on.

\* \* \* \* \*